3,475,649
Patented Oct. 28, 1969

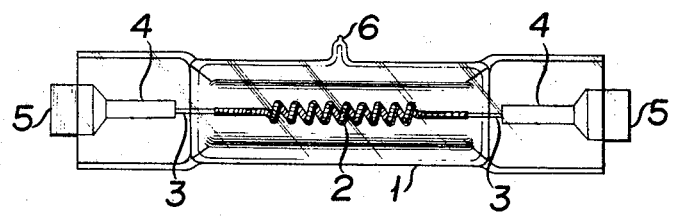

3,475,649
TUNGSTEN INCANDESCENT LAMPS WITH IODINE HALIDES
Naoyoshi Nameda, Yokohama-shi, and Sinji Yonemoto, Kanagawa-ken, Japan, assignors to Tokyo Shibaura Electric Co., Ltd., Kawasaki-shi, Japan, a corporation of Japan
Filed Sept. 18, 1967, Ser. No. 668,458
Claims priority, application Japan, Sept. 20, 1966, 41/62,125; Aug. 4, 1967, 42/49,747
Int. Cl. H01j *17/20, 61/12;* H01k *1/50*
U.S. Cl. 313—223                                  4 Claims

ABSTRACT OF THE DISCLOSURE

A tungsten incandescent lamp having a tungsten filament in a transparent envelope in which iodine monobromide, iodine monochloride or iodine trichloride is filled in the envelope together with inert gas such as argon.

Background of the invention

The present invention relates to an incandescent lamp having a tungsten filament provided in the interior of a transparent airtight envelope, more particularly to a tungsten incandescent lamp wherein halogen is filled into the airtight envelope.

An iodine incandescent lamp, having a tungsten filament sealed in an airtight envelope and additionally halogens such as iodine similarly filled therein, possesses a higher luminous efficiency and longer life than an incandescent lamp of the same specification but without halogens. The high luminous efficiency of the iodine-filled incandescent lamp results from the reaction or regenerative cycles occurring between the tungsten and the halogen when the filament is heated to elevated temperatures by its resistance heat.

In general, the halogen to be filled in an incandescent lamp is iodine. However, where iodine is introduced in an amount deemed sufficient to attain a satisfactory luminous efficiency, it has been observed that the quantity of light actually radiated from the lamp is substantially smaller than that theoretically estimated. This reason is attributed to the fact that iodine has a large absorption to the light of certain specific wavelengths within the visible region, the absorption being nine percent or more of the total quantity of light which will be radiated from the lamp. With an incandescent lamp having a relatively large capacity, the use of iodine is accompanied with another drawback that part of the iodine is precipitated on the inner surface of the bottom of the envelope, thereby causing local irregularities in the color of light available from the lamp.

To avoid these shortcomings of iodine, attempts have been made to use halogen other than iodine such as fluorine, chlorine or bromine. Such other halogens do not absorb visible light and produce the formation of opaque sediments, but, due to their corrosive nature to the metal filament and other metal members sealed into the lamp, it has been required to protect the metal members from corrosion by some suitable means. However, the method for prevention of corrosion, for example, the use of hydrogen, raises the cost of a lamp and is generally not deemed substantially effective. For instance, where hydrogen is introduced into the envelope, it initially displays a preferable effect of preventing corrosion, but it slowly leaks out of the envelope by permeating its wall when it reaches elevated temperatures after the lamp is lit. Furthermore, since chlorine and fluorine are gases and bromine is liquid at normal temperature, it is difficult to introduce such halogens into the envelope in the amounts specified according to the inner volume of the envelope, and the use of these halogens dictates that precaution be taken in connection with the possible corrosion of equipment used in their sealing.

Summary of the invention

The present invention provides a tungsten incandescent lamp having iodine monobromide, iodine monochloride or iodine trichloride filled together with inert gas in a transparent envelope including a tungsten filament.

The iodine halide sealed in the lamp envelope is dissociated into iodine and other halogen when the tungsten filament is heated to elevated temperatures, and these two elements react with the tungsten to form reaction cycles or regenerative cycles known in the art. The elements which take part in the reaction cycles with tungsten are iodine and the other members of the halogen group. The element of iodine has the same or smaller number of atoms as compared with those of the other halogen elements. Therefore in the envelope where any of the aforementioned iodine compounds is filled, the iodine atoms associated with the reaction cycles are reduced to half of, or less than, those present in the same type of envelope containing only iodine. This means that reduction in the quantity of light due to the absorption by iodine itself is minimized.

Brief description of the drawing

A single drawing attached herewith shows a plan view of the tungsten incandescent lamp embodying this invention.

Description of the preferred embodiment

According to the present invention, an envelope made of transparent heat resistant material, for example, fused quartz which includes a tungsten filament has an iodine halide selected from the group consisting of iodine monobromide, iodine monochloride and iodine trichloride filled together with inert gases, for example, argon.

The iodine halides listed above are solids at normal temperature and chemically stable. When heated by the filament in the lamp envelope, these iodine halide compounds are dissociated into the components e.g., iodine and other halogens. The atoms of iodine and other halogens thus released respectively carry out separate reaction cycles with the tungsten filament.

In connection with these reaction cycles, the number of iodine atoms and that of halogen atoms present in the lamp envelope are in the ratio of 1:1 where monobromide or monochloride of iodine is used, and 1:3 in the case of iodine trichloride. Theoretically, therefore, iodine is associated with one half or a quarter of the total reaction cycles or regenerative cycles occurring within the lamp envelope. This means that absorbence by iodine itself and the consequential decrease in the quantity of light emitted from the lamp are considerably minimized. A more important fact that iodine halide filled in the envelope does not substantially corrode the metal members such as supporting and lead-in wires for the filament which are exposed within the envelope, whereby prolonging the lamp life until the filament is broken due to naturally occurring failures.

To prevent the corrosion of said metal parts, hydrogen may be additionally introduced. Under the conditions of elevated temperatures, hydrogen slowly escapes outside of the envelope made of, for example, fused quartz, by penetrating through intertices of the molecular structures, but, while it remains within the envelope, it may be expected to further reduce the corrosion which might be caused by the substances released or derived from the iodine halides.

Although the present invention is not limited with respect to the amounts of iodine halides to be filled in a lamp envelope, to obtain the substantial effect of the material thus filled concerning the quantity of light or the brightness of color produced. it is required to employ at least 0.01 micromol of iodine halide per cubic centimeter of the inner volume of the envelope. On the other hand, introduction of excess iodine halide would increase the presence in the envelope of those portions of halogen which do not react with tungsten even under normal operating conditions, with the result that the greater deposits of opaque precipitates would degrade the desirable light disturbing property of the lamp, and that the excess halogen would corrode the metal members. It has been found that the preferable amount of iodine halide compounds, in the case of iodine trichloride, is in the range from 0.01 to 0.6 micromol per cubic centimeter of the envelope volume, and in the case of iodine monobromide, is in the range from 0.1 to 1.2 micromol per cubic centimeter of the envelope volume. When the iodine halide is used in the above range, the lamp will have a sufficient property in brightness without any corrosion at the metal members.

In the drawing, there is illustrated a typical tungtsen incandescent lamp according to this invention which includes a transparent envelope 1 of fused quartz and a double coiled tungsten filament 2 placed in the envelope. The filament 2 is supported by a pair of lead-in wires 3 connected to the alternate ends of the filament, and the lead-in wires are electrically connected to a pair of terminals 7 through rectangular foil members 4. Both ends of the envelope 1 are hermetically press sealed so as to fit in position the lead-in wires 3, foil members 4 and terminals 5. Also the envelope 1 is provided with an exhaust tube 6, the exhaust tube removed to complete hermetically sealing after iodine halide and inert gas is filled into the interior of the envelope 1.

In the present invention, iodine halides may be introduced into a lamp envelope by any known manner. According to one of the practical sealing procedures, the interior of an envelope including a tungsten filament is heated to, for example, 1000° C. and evacuated to about $10^{-4}$ mm. Hg in advance. Then introduced into the envelope thus evacuated are gaseous mixtures of iodine halide and inert gas in the predetermined amounts. The envelope is cooled until the iodine halide introduced condensates, and the gases still remaining therein are further replaced to pure inert gas and, if necessary, with inert gas containing hydrogen and finally the envelope is sealed. In the process of filling iodine halide, if iodine monobromide, iodine monochloride or iodine trichloride is contained in the envelope, the filled iodine halide compound will display a specific bluish green light by the glow discharge when the envelope is placed in a high frequency field, so that the presence of the iodine halide compound can be easily ascertained.

According to the present invention, iodine monobromide, iodine monochloride and iodine trichloride may be employed along or in mixture with the desired combination. To carry out sufficient reaction cycles or regenerative cycles with the tungsten in the envelope, the components of these iodine halides are required to be in the gaseous form. The inner wall surface of the envelope, therefore, should be kept at temperatures higher than those at which the iodine halides can evaporate. However, the evaporating temperatures of these compounds are 77° C. for iodine trichloride, about 116° C. for iodine monobromide and about 200° C. for even the iodine monochloride which requires the highest temperature. Consequently it will be unnecessary to modify the construction of an ordinary incandescent lamp specifically to raise the temperature of the inner wall surface of its envelope. The reason is that the ordinary incandescent lamp is designed to be kept at higher than 400° C. at the inner surface of the envelope when the lamp is lit in order that halides of tungsten may not be precipitated on the surface.

Experiments showed that the incandescent lamp according to the present invention displays a high luminous efficiency and a long effective life without the formation of undesirable deposits when it was repeatedly switched on and off. In these experiments there was employed an incandescent lamp 10 mm. in diameter, 72 mm. in luminous length, and 119 mm. in total length, with the rated voltage of 105 v., and energy consumption of 500 w./hr., into which iodine monobromide was introduced at the rate of 0.5 micromol per cubic centimeter of the inner volume of the envelope made of fused quartz. The lamp was tested by being intermittently lit 7 seconds with 2 seconds interavls. During the test period there was observed no formation of opaque deposits. For comparison a test was also made under the same conditions on an incandescent lamp of the same specification excepting that iodine alone was filled at the rate of 0.5 micromol per cubic centimeter of the inner volume of the envelope. In this test it was observed that there was a substantially large formation of black deposits. The test results of the two lamps are given below.

| Filled gas | Filled gas volume (micromol/cc.) | Luminous flux (lumen) | Life under over-voltage (at 126 volts) (hr.) |
|---|---|---|---|
| Iodine monobromide | 0.5 | 10,170 | 340 |
| Iodine | 0.5 | 9,340 | 300 |

While the invention has been described in connection with some preferred embodiments thereof, the invention is not limited thereto and includes any modifications and alterations which fall within the true spirit and scope of the invention as defined in the appended claims.

What is claimed is:

1. In a tungsten incandescent lamp comprising a transparent envelope including a tungsten filament in which halogen and inert gas filled therein, the improvement is that said halogen is iodine halide compound selected from the group consisting of iodine monobromide, iodine monochloride and iodine trichloride.

2. The tungsten incandescent lamp according to claim 1 wherein said halogen compound is iodine monobromide, and said iodine monobromide is introduced into said envelope at the rate ranging from 0.1 to 1.2 micromol per cubic centimeter of the inner volume of said envelope.

3. The tungsten incandescent lamp according to claim 1 wherein said halogen compound is iodine trichloride, and said iodine trichloride is introduced into said envelope at the rate ranging from 0.01 to 0.6 micromol per cubic centimeter of the inner volume of said envelope.

4. The tungsten incandescent lamp according to claim 1 wherein hydrogen is introduced into the envelope together with said halogen compound and inert gas.

References Cited

UNITED STATES PATENTS

| 497,038 | 5/1893 | Waring | 313—222 X |
| 3,022,438 | 2/1962 | Cooper | 313—223 X |
| 3,022,439 | 2/1962 | Cooper et al. | 313—223 X |
| 3,091,718 | 5/1963 | Shurgan | 313—222 |

JAMES W. LAWRENCE, Primary Examiner

DAVID O'REILLY, Assistant Examiner

U.S. Cl. X.R.

313—224, 226